Dec. 31, 1963   M. D. KOONTZ   3,116,074
LOAD-DISTRIBUTING DEVICE FOR TRACTOR-TRAILER COMBINATIONS
Filed Feb. 28, 1962   2 Sheets-Sheet 2

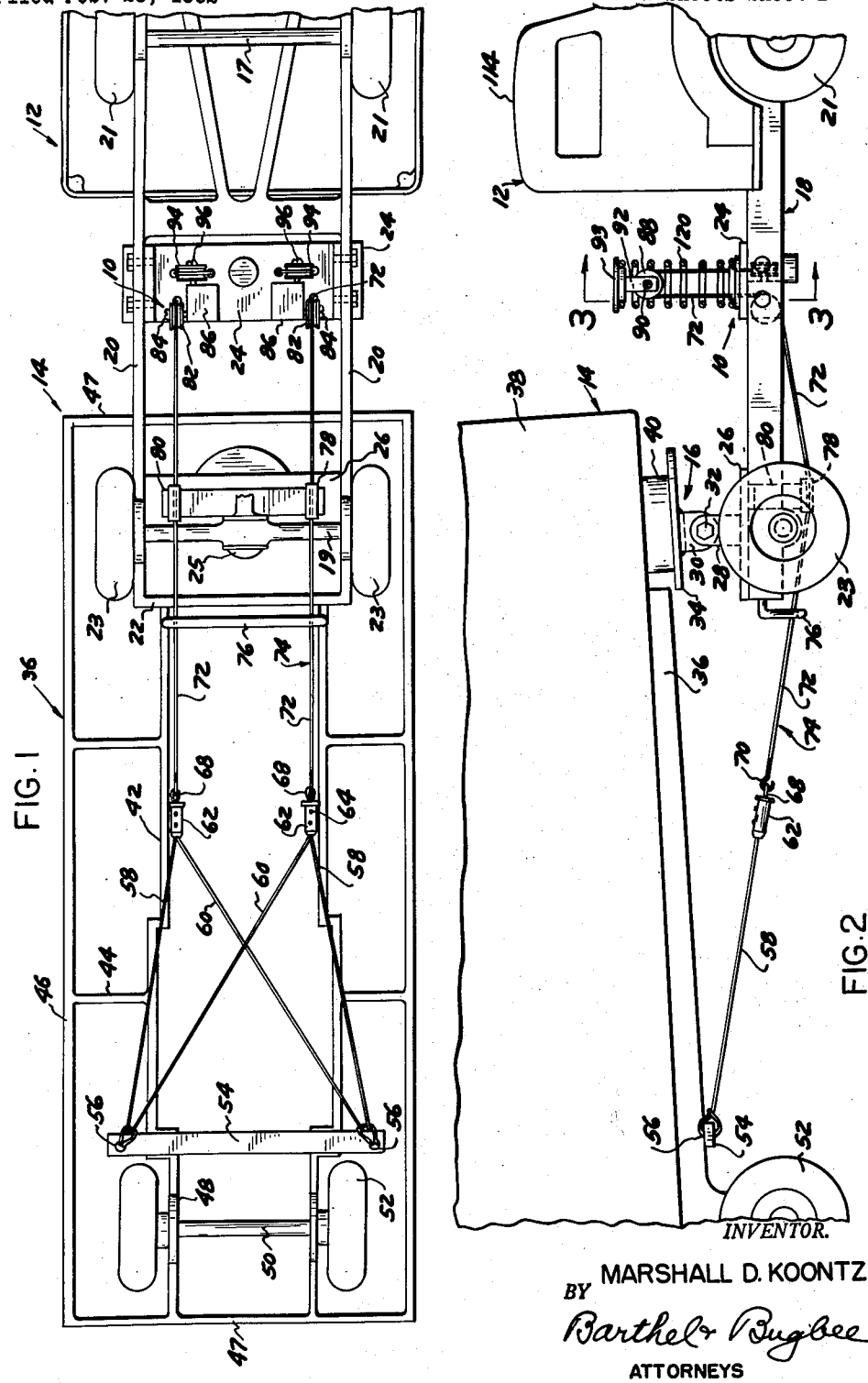

INVENTOR.
MARSHALL D. KOONTZ
BY
Barthel & Bugbee
ATTORNEYS.

United States Patent Office 3,116,074
Patented Dec. 31, 1963

3,116,074
LOAD-DISTRIBUTING DEVICE FOR TRACTOR-TRAILER COMBINATIONS
Marshall D. Koontz, 15326 Petoskey Ave., Detroit, Mich.
Filed Feb. 28, 1962, Ser. No. 176,328
9 Claims. (Cl. 280—405)

This invention relates to tractor-trailer vehicle combinations and, in particular, to load-distributing devices for such combinations.

One object of this invention is to provide an improved load-distributing device for tractor-trailer vehicle combinations whereby the load carried by a trailer or semi-trailer may be adjusted so as to transfer a portion of the load from the trailer or semi-trailer to the tractor and thereby alter the distribution or proportioning of the load between the front and rear wheels of the tractor so as to increase the traction and steering of the front wheels, prevent nose-diving of the tractor, eliminate jack-knifing or side swinging of the trailer or semi-trailer relatively to the tractor, and vary the proportionate wheel load to conform to various state highway laws, the major part of the load-distributing device being disposed on the tractor where it is most easily accessible and eliminates the necessity for providing the tractor-mounted portions of the mechanism on each trailer or semi-trailer, as hitherto required.

Another object is to provide an improved load-distributing device of the foregoing character wherein the trailer or semi-trailer is provided with elongated flexible load-transmitting members such as cables or chains which are connected to the trailer or semi-trailer near the rear axle or axles thereof and which are coupled to cables leading to the load-adjusting mechanism on the tractor, thereby reducing the expense of the portion of the installation needed to be mounted on each trailer or semi-trailer, simplifying its manufacture, installation, maintenance and repair, placing the major part of the load-distributing mechanism of the device close to the power source on the tractor, thereby eliminating hoses, couplings and the like previously necessary where such mechanism was mounted on the trailer or semi-trailer, and, in general, reducing to a minimum the equipment on the trailer which is idle while the trailer is idle.

Another object is to provide an improved load-distributing device of the foregoing character wherein the springs employed in the load-transferring adjustment are adjusted by mechanical or hydraulic means mounted on the tractor and hence easily accessible to the operator of the tractor or to other persons whose duties require them to work on the device.

Another object is to provide an improved load-distributing device of the foregoing character wherein the tension-applying springs and their associated mechanism are mounted in vertical positions on the tractor chassis, preferably immediately behind the cab, where they occupy the minimum of space and are least likely to be in the way of the coupling mechanism yet are instantly accessible and available for repairs, adjustment or maintenance.

Other objects and advantages of the invention will become apparent during the course of the following description of the accompanying drawings, wherein:

FIGURE 1 is a bottom plan view of a tractor-trailer vehicle combination, according to one form of the invention, with the forward end of the tractor omitted to conserve space;

FIGURE 2 is a side elevation of the tractor-trailer vehicle combination shown in FIGURE 1;

Figure 5:
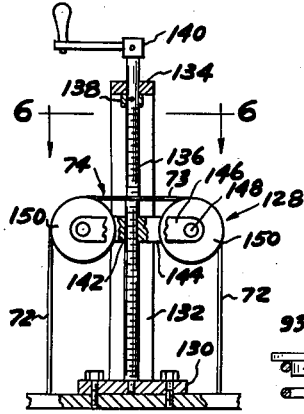
FIGURE 5 is an elevation, partly in vertical section, of a modification of the load-adjusting mechanism (FIGURES 3 and 4) but employing screw-and-nut mechanism for raising and lowering the cable-tension-adjusting pulley cross head.

The present invention is a further improvement upon the inventions disclosed and claimed in my prior U.S. Patents Nos. 2,961,533, issued October 12, 1954 for Load-Distributing Arrangement for Tractor-Trailer Combinations and 2,756,072, issued July 24, 1956 for Stabilized Trailer Load Distributor, in that it achieves the same advantages and new results of being able to decrease an excessive load upon the rear wheels of the trailer or semi-trailer and transfer a portion of it to the front wheels of the tractor so as to accomplish the objects set forth above. In addition, the present invention provides an improved load-distributing device wherein the load-adjusting mechanism, instead of being mounted on the trailer or semi-trailer, as in my above-identified prior patents, is now mounted upon the tractor itself. By this construction, as more fully disclosed and claimed below, the trailer or semi-trailer part of the installation is greatly simplified and its expense and labor of installation consequently greatly reduced, but also less mechanism is installed upon each trailer or semi-trailer where it adds to the investment tied up in such vehicles, and less mechanism is consequently idle when the trailer or semi-trailer is itself idle. In other words, by mounting the load-adjusting portion of the load-distributing mechanism upon the tractor, that portion of the mechanism is in use a far greater proportion of the time and consequently the cost of idleness of such mechanism is correspondingly reduced. Moreover, the mounting of the load-adjusting mechanism upon the tractor with the tension-applying springs mounted preferably in a vertical position immediately behind the cab, renders it more accessible for operation, repair of maintenance. At the same time, this construction entails less risk to the operator or repair man who otherwise had to adjust load-adjusting mechanism mounted on the trailer or semi-trailer in a far less accessible position and, for certain repairs or maintenance, required the repair or maintenance men to crawl beneath the trailer or semi-trailer itself, with consequent hazard and inconvenience.

Referring to the drawings in detail, FIGURES 1 and 2 show an improved tractor-trailer load-distributing device, generally designated 10, according to one form of the invention, as applied to a conventional towing vehicle or tractor 12 and a conventional towed vehicle or trailer or semi-trailer 14, connected to one another through a conventional coupling arrangement, generally designated 16, such as the well-known so-called fifth wheel arrangement. Such coupling arrangements are widely manufactured and installed upon conventional tractor-trailer vehicle combinations and hence the arrangement 16 is merely shown diagrammatically. If the towed vehicle 14 is a semi-trailer, it is supported, during periods of parking, by a conventional trailer prop (not shown) mounted beneath the forward end of the vehicle adjacent the coupling arrangement 16, the prop being omitted from the drawings in order to simplify the disclosure.

The tractor 12 as usual is provided with a chassis frame 18 including side members 20 interconnected at their forward and rearward ends by cross members 22 (the forward cross member 22 being omitted because of the omission of the forward end of the tractor 12). The tractor 12 is equipped with the usual front and rear axles 17 and 19 which in turn carry rubber-tired front and rear wheels 21 and 23 respectively. It will be understood that the front axle 17 and rear axle 19 are equipped with the usual springing, that the front axle 17 is provided with conventional steering mechanism, and that the rear axle 19 is provided with the usual differential driven by a propeller shaft through the usual universal joints. These conventional mechanisms are well known, hence have been omitted from the drawing in order to simplify the disclosure and emphasize the components of the present invention. The differential housing is shown at 25 to indicate that the rear axle 19 is driven, but its power connection through a propeller shaft to the conventional motor is omitted for reasons just given. For convenience and simplicity of showing, the various components of the load-distributing device are illustrated in the drawings as applied to a demonstration model of a tractor-trailer combination construction upon a reduced scale but successfully demonstrating the action and advantages of the invention. In this model the steering and propelling arrangements were omitted as unnecessary to the demonstration of the capability of the invention.

Also mounted on the chassis frame 18 are intermediate and rearward platforms 24 and 26 respectively. The vehicle coupling arrangement 16, such as a fifth wheel, has its base mounted upon the rearward platform 26 and is shown diagrammatically as having upright portions 28 and 30 pivoted horizontally to one another as at 32, the upper portion 30 carrying a plate 34 of the fifth wheel 16. The semi-trailer 14 has a chassis frame 36 which carries the body 38 and also its coupling component 40 such as a king pin cooperating with the plate 34 of the coupling arrangement or fifth wheel 16.

The trailer or semi-trailer chassis frame 36 includes inner longitudinal frame members 42 carrying outriggers 44 which in turn carry outer longitudinal frame members 46 which are interconnected by end cross members 47 and support the periphery of the trailer body 38. The longitudinal members 42 near their rearward ends are provided with depending parallel rear axle supports 48 which at their lower ends support a rear axle 50. Rotatably mounted on the rear axle 50 are rubber-tired rear wheels 52.

Bolted or otherwise secured to the inner longitudinal frame members 42 near the rear wheels 52 in parallel relationship to the rear axle 50 is a cross beam 54. The opposite ends of the cross beam 54 are provided with anchorages 56 (FIGURE 1) for the rearward ends of rearward flexible tension members or main trailer cables 58 and for diagonal cross cables 60 connected to one another at cable clamps 62. The cable clamps 62 are of any suitable type, several such types being available on the open market. The opposite halves of the cable clamps 62 are clamped together by means of bolts or screws 64 and have eyes 68 projecting forwardly. Detachably engaging the eyes 68 are hooks 70 connected to the rearward free ends of parallel courses 72 having at their forward ends a transverse connecting portion 73 and collectively forming a forward flexible tension member or tractor cable 74. The separate courses 72 pass over a depending guide bar 76 secured to the rearward end cross member 22 and through parallel tubular guide members 78 secured to the lower ends of depending angle brackets 80, the upper ends of which are bolted or otherwise secured to the under side of the rearward platform 26.

Forwardly of the tubular guides 78, the tractor cable courses 72 pass upward around grooved lower rearward pulleys or sheaves 82 rotatably mounted on axles 84 supported by brackets 86 bolted or otherwise secured to and depending from the under side of the forward platform 24. The cable courses 72 continue upward around upper grooved pulleys 88, the axles 90 (FIGURE 2) of which are mounted in depending brackets 92 secured to the under sides of flanged circular heads or pressure discs 93. After passing around the upper pulleys 88 and the lower rearward pulleys 82, the cable courses 72 pass downward around lower forward grooved pulleys 94, the axles 96 of which (FIGURE 1) are secured to the brackets 86 at right angles to the axles 84 of the lower rearward pulleys 82 so that the central planes of the pulleys 82 are parallel to the chassis frame side members 20 and to one another, whereas the central planes of the pulleys 94 coincide and are perpendicular to the frame side members 20.

Figure 3:
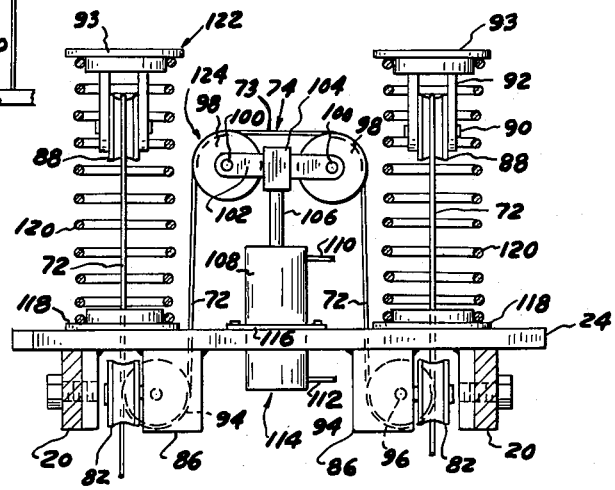
FIGURE 3 is a vertical cross-section taken along the line 3—3 in FIGURE 2, showing somewhat diagrammatically the load-adjusting portion of the device.

After passing around the lower forward pulleys 94, the cable courses 72 pass upward around cross head pulleys 98 and join one another in their connecting portion 73 to form the single tractor cable 74 (FIGURE 3). The cross head pulleys 98 are mounted upon parallel axles 100 which in turn are mounted in the opposite ends of brackets 102 forming the outer ends of a cross head 104. The cross head 104 is mounted on and secured to the upper end of a reciprocable hydraulic piston 106, the piston head (not shown) of which is reciprocably mounted in a hydraulic cylinder 108 provided with upper and lower service ports 110 and 112 connected by way of a conventional four-way valve (not shown) preferably located within the cab 114 of the tractor 12 within easy reach of the operator and connected to a source of hydraulic pressure, such as a hydraulic pump (not shown). The hydraulic piston 106 and hydraulic cylinder 108 collectively form a reciprocatory hydraulic motor, generally designated 114.

The hydraulic cylinder 108 is mounted on the upper side of the forward platform 24 by means of an annular attachment plate 116. Also mounted outboard of the attachment plate 116 on opposite sides thereof and on the upper side of the forward platform 24 are two spring abutment discs 118 suitably drilled for the passage of the portions of the cable courses 72 proceeding upward to and downward from the upper pulleys 88. Encircling these cable portions are the convolutions of a pair of heavy and powerful helical compression springs 120, the lower ends of which engage the abutment discs 118 and the upper ends the flanged heads 93. The forward platform 24 is suitably drilled for the passage of the portions of the cable courses 72 proceeding upward from the forward lower pulleys 94 to the cross head pulleys 98. The springs 120, hydraulic motor 114, cross head 104 and their associated pulleys 82, 88, 94 and 98 collectively constitute a variable tension-applying apparatus, generally designated 122, equipped with a tension-varying appliance, generally designated 124.

In the operation of the invention, let it be assumed that the tractor 12 has been backed up to the trailer or semi-trailer 14 and coupled thereto by means of the fifth wheel or other coupling arrangement 16, after which the trailer prop (not shown) is raised to its traveling position, if the towed vehicle 14 is a semi-trailer. The operator then couples the hook 70 to the parallel courses 72 of the tractor cable 74 to the eyes 68 of the cable clamps 62 and operates the hydraulic motor 114 (FIGURE 3) to raise the crosshead 104 and its pulleys 98 a sufficient amount to properly tension the tractor cable 74 and with it the main trailer cable 58. This he does by shifting the previously-mentioned four-way valve (not shown) in the cab 114 in such a manner as to admit hydraulic pressure fluid to the service pipe 112 at the lower end of the hydraulic cylinder 108 and to discharge hydraulic fluid to the service pipe 110 at the upper end thereof. This action causes the hydraulic piston or plunger 106 to rise, carrying with it the cross head 104 and its pulleys 98 (FIGURE 3), pulling upward upon the interconnected opposite courses 72 of the tractor cable 74, tightening the latter and compressing the springs 120 by the consequent pulling downward of the upper pulleys 88 and the heads 93 to which their brackets 92 are connected.

The pull applied in this manner to the tractor cable 74 from the hydraulic motor 114 and compression springs 120 is transmitted through the main trailer cables 58 to the cross beam 54 near the rear axle 50 of the trailer or semi-trailer 14. This action has the result of lightening the load carried by the trailer or semi-trailer 14 and normally exerted upon the rear axle 50 and rear wheels 52 thereof and rear wheels 23 of the tractor 12. This it does by transferring a portion of this load through the cables 58 and 74 to the tractor 12, where it is exerted in part upon the front wheels 21 of the tractor 12 as well as in part upon the rear wheels 23 thereof.

The application of a portion of the load to the front wheels 21 of the tractor 12 in this manner increases the effectiveness of steering by increasing the grip of the front wheels 21 upon the road bed and accordingly imparts superior steering control and consequently enhanced safety of operation to the tractor-trailer combination 12, 14. At the same time, the greater tendency toward equalizing the distribution of the load upon the various wheels 21, 23 and 52 instead of concentrating the major part of it upon the trailer rear wheels 52 as in conventional vehicles, satisfies state laws and regulations regarding such distribution and enables the tractor-trailer combination to successfully pass weighing tests at weighing stations on the highway which it would otherwise fail if it carried a full load. The present invention thus enables a greater load to be transported by more evenly distributing that load upon the various wheels of the tractor 12 and trailer 14. Furthermore, the cornering capabilities of the tractor-trailer combination are greatly improved by the present invention and the danger of side sway or side swing known as "jackknifing" is substantially eliminated. The diagonal cables 60 (FIGURE 1) also provide cross connections which stabilize the trailer by further assisting in eliminating side sway.

Meanwhile, during travel of the vehicles 12 and 14, as the tractor 12 makes a turn in the highway, the trailer 14 pivots around the fifth wheel or other coupling 16 so that its center line is disposed at an angle to the center line of the tractor 12. Under these circumstances of turning corners in the highway, the cable 74 on the tractor 12 and the various pulleys thereon alter their relative positions as the pulleys are caused to roll relatively to the two courses 72 of the tractor cable 74, thereby automatically paying out one course 72 while taking in the other course 72 during the making of turns in either direction while at the same time maintaining the desired load-transferring tension upon the tractor cable 74 and, through it, to the trailer cables 58 and 60.

When the vehicles 12 and 14 have arrived at their destination and it becomes necessary to back the trailer or semi-trailer 14 into a loading dock or maneuver the vehicles 12 and 14 in restricted areas such as on a parking lot or in a garage, the operator manipulates the control valve (not shown) to admit pressure to the upper service pipe 110 above the piston 106 and to discharge hydraulic fluid from the lower service pipe 112. This action causes the piston 106 and cross head 108 to descend so as to release the tension upon the cables 58, 60 and 74 by permitting the springs 120 to expand from their compressed condition. The operator is then able to maneuver his vehicles 12 and 14 freely, even to the extent of placing his tractor 12 at right angles to the trailer 14, a maneuver which could not be carried out while the cables 58, 60 and 74 were in their tensioned condition.

The operator can vary the pull upon the cables 58 and 74 without leaving his cab 114 of his tractor 12 merely by manipulating the four-way control valve (not shown) which causes hydraulic pressure fluid to move the piston 106 and cross head 104 upward or downward by supplying such pressure fluid, as desired, to either the service pipe 112 or the service pipe 110. Since the major part of the components of the load-distributing device is mounted upon the tractor 12, the hydraulic motor 114 is easily and directly provided with pressure fluid from a pump driven by the engine of the tractor 12 without the need for detachable couplings which would be necessary if the load-adjusting hydraulic motor 114 were mounted upon the trailer or semi-trailer 14.

Figure 6:
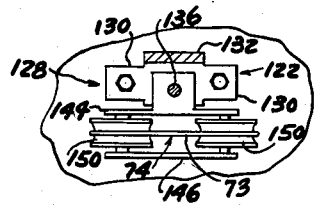
FIGURE 6 is a horizontal section of the mechanism shown in FIGURE 5, taken along the line 6—6 therein.
Figure 4:
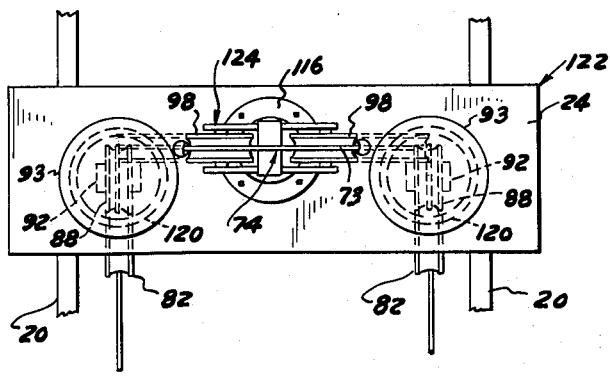
FIGURE 4 is a top plan view of the mechanism shown in FIGURE 3.

The modified variable tension-applying apparatus, generally designated 126, shown in FIGURES 5 and 6, employs the same tension-applying springs 120 and associated guide wheels 82, 88 and 94 shown in the right-hand and left-hand portions of FIGURES 3 and 4, but utilizes a modified tension-varying appliance, generally designated 128. The latter includes a base plate 130 bolted or otherwise secured to the tractor platform 24 and carying an upright frame 132 having an upper cross member 134.

Rotatably mounted in the base plate 130 and cross member 134 is a screw shaft 136 carrying a retaining collar 138 beneath the cross member 134. Secured to the upper end of the screw shaft 136 is a shaft-rotating means 140. A hand crank is shown for exemplification of manual means for rotating the screw shaft 136 but it will be evident that power means, such as through a power take-off and gearing from the tractor motor, would ordinarily be employed on account of its greater power and speed of operation.

The screw shaft 136 threadedly engages a threaded bore 142 in a cross head 144 of approximately T-shaped form carrying approximately parallel axles 148 which in turn rotatably support grooved pulleys 150. Trained over and around the grooved pulleys 150 are the meeting portions of the two cable courses 72 which make up the cable 74. The portions of the cable courses 72 not shown in FIGURES 5 and 6 are trained around pulleys 82, 88 and 94 similar to those shown in FIGURES 3 and 4, with similar accompanying components.

The operation of the variable tension-applying apparatus 126 is generally similar to that described above for the variable tension-applying apparatus 122, differing only in the operation of the tension-varying appliance 128. To vary the tension exerted upon the cable or other flexible tension member 74, the operator rotates the screw shaft 136 to raise or lower the cross head 144 relatively to the upright frame 132 and consequently to raise and lower the pulleys 150 carried thereby. The remainder of the action is similar to that of the tension-varying appliance 124 except that the pulleys 98 of the latter are raised and lowered hydraulically, as described above.

What I claim is:

1. A load-distributing device for tractor-trailer vehicle combinations interconnected by a coupling wherein each vehicle has a coupling end adjacent said coupling and a remote end remote from said coupling, said device comprising a pair of laterally-spaced flexible tension member anchorages mounted on the trailer vehicle at a location nearer its remote end than its coupling end, a tension-adjusting wheel carrier movably mounted on the tractor vehicle at a location spaced away from its coupling end, a tension-adjusting wheel means rotatably mounted on said carrier for movement therewith, a flexible tension member disposed in an approximately U-shaped path along said vehicles with its rearward ends secured to said anchorages, said flexible tension member including substantially parallel portions extending from said anchorages along opposite sides of said vehicle and a connecting portion extending between said parallel portions to and around said tension-adjusting wheel means, means mounted on the tractor vehicle for adjustably moving said tensions adjusting wheel carrier relatively to said anchorages in tension-varying relationship with said flexible tension member, and resilient means mounted on the tractor vehicle and yieldingly engaging said flexible tension member in tension-applying relationship therewith.

2. A load-distributing device for tractor-trailer vehicle combinations interconnected by a coupling wherein each vehicle has a coupling end adjacent said coupling and a remote end remote from said coupling, said device comprising
- a pair of laterally-spaced flexible tension member anchorages mounted on the trailer vehicle at a location nearer its remote end than its coupling end,
- a tension-adjusting wheel carrier movably mounted on the tractor vehicle at a location spaced away from its coupling end,
- a tension adjusting wheel means rotatably mounted on said carrier for movement therewith,
- a flexible tension member disposed in an approximately U-shaped path along said vehicles with its rearward ends secured to said anchorages,
  - said flexible tension member including substantially parallel portions extending from said anchorages along opposite sides of said vehicle and a connecting portion extending between said parallel portions to and around said tension-adjusting wheel means,
- means for adjustably moving said tension adjusting wheel carrier relatively to said anchorages in tension-varying relationship with said flexible tension member,
- and resilient means yieldingly engaging said flexible tension member in tension-applying relationship therewith,
  - said resilient means including spring means and a contact member carried by said spring means and engaging said flexible tension member in tension-applying relationship therewith,
- said spring means include a plurality of springs disposed in spaced relationship, and
- wherein said wheel carrier adjustable moving means is disposed in the space between said springs.

3. A load-distributing device, according to claim 2, wherein said springs are helical springs mounted with their axes substantially parallel to one another.

4. A load-distributing device, according to claim 3, wherein said springs are mounted with their axes substantially vertical,
wherein guide wheel means is rotatably mounted on the tractor,
and wherein a portion of said flexible tension member is disposed in a substantially vertical direction adjacent said spring.

5. A load-distributing device, according to claim 1, wherein said resilient means has a force-applying member including a pulley disposed adjacent one end thereof,
and wherein said flexible tension member engages said pulley.

6. A load-distributing device, according to claim 5, wherein said force-applying member includes a pressure head connected to said pulley,
and wherein said flexible tension member extends around and engages said pulley.

7. A load-distributing device, according to claim 6, wherein said resilient means includes a compression spring, and wherein said pressure head is disposed in compressing engagement with said spring.

8. A load-distributing device, according to claim 3, wherein said springs are compression springs,
wherein a force-applying member is disposed adjacent one end of each spring in compressing engagement therewith,
and wherein said flexible tension member engages said force-applying member.

9. A load-distributing device, according to claim 8, wherein said springs are mounted with their axes substantially vertical,
wherein guide wheel means is rotatably mounted on the tractor,
and wherein a portion of said flexible tension member is disposed in a substantially vertical direction adjacent said spring.

References Cited in the file of this patent

UNITED STATES PATENTS

| 2,691,533 | Koontz | Oct. 12, 1954 |
| 2,756,072 | Koontz | July 24, 1956 |

FOREIGN PATENTS

| 1,074,982 | Germany | Feb. 4, 1960 |